United States Patent [19]

Défago et al.

[11] 3,995,992
[45] Dec. 7, 1976

[54] TRANSFER PRINTING PROCESS FOR DYEING AND PRINTING ORGANIC MATERIAL WHICH CAN BE DYED WITH CATIONIC DYES

[75] Inventors: Raymond Défago, Riehen; Paul Schaffluetzel; Jaroslav Haase, both of Basel, all of Switzerland

[73] Assignee: Ciba-Geigy AG, Basel, Switzerland

[22] Filed: Sept. 30, 1974

[21] Appl. No.: 510,944

[30] Foreign Application Priority Data

Oct. 18, 1973 Switzerland .................... 14755/73

[52] U.S. Cl. .............................. 8/2.5 R; 8/172 R; 8/177 R; 106/22
[51] Int. Cl.$^2$ ............................................ D06P 5/00
[58] Field of Search ................. 8/2.5, 172, 177 R; 106/22

[56] References Cited

UNITED STATES PATENTS

| | | | |
|---|---|---|---|
| 2,589,208 | 3/1952 | Craig | 260/465.5 A |
| 2,952,653 | 9/1960 | Heller | 8/115.5 |
| 2,963,507 | 12/1960 | Rudner | 260/465.5 R |
| 3,020,310 | 2/1962 | Fowler | 260/465.5 R |
| 3,051,736 | 8/1962 | Horn | 8/177 R |
| 3,114,588 | 12/1963 | Lewis | 8/177 R |
| 3,413,071 | 11/1968 | Davis | 8/2.5 |
| 3,782,896 | 1/1974 | Defago et al. | 8/2.5 |

OTHER PUBLICATIONS

The Chemistry of Acrylonitrile, 2nd pp. 157, 183–186, pub. by Amer. Cyanamid Co.

*Primary Examiner*—Donald Levy
*Attorney, Agent, or Firm*—Wenderoth, Lind & Ponack

[57] ABSTRACT

A process for dyeing and printing organic material which can be dyed with cationic dyes by the transfer printing process, which comprises the use of an auxiliary carrier which contains at least one disperse and/or cationic dye that is converted into the vapor state at atmospheric pressure and at a temperature between 150° C and 220°C, and at least one organic compound as transfer promoter with a vapor pressure higher than $10^{-5}$ Torr at 200°C.

10 Claims, No Drawings

TRANSFER PRINTING PROCESS FOR DYEING AND PRINTING ORGANIC MATERIAL WHICH CAN BE DYED WITH CATIONIC DYES

The present invention provides a transfer printing process for dyeing and printing organic material which can be dyed with cationic dyes, in particular synthetic fibrous material of polyacrylonitrile and modacryl, using organic compounds whose vapour pressure at 200° C is higher than $10^{-5}$ Torr. The invention also provides the dyeing preparations and carriers suitable for this process as well as the organic material dyed and printed by the novel process.

Transfer printing processes are known which consist in dyeing and printing synthetic fibres of organic material that can be dyed with cationic dyes, in particular polyacrylonitrile fibres, over the course of 10 to 60 seconds at temperatures from about 190° to 220° C with disperse dyes or cationic dyes which are converted into the vapour state at atmospheric pressure and at a temperature between 150° C and 220° C. However, when using polyacrylonitrile fibres, a distinct and undesirable yellowing and hardening of the fibres usually occurs under transfer conditions which are advantageous for disperse dyes, i.e., depending on the duration of action at temperatures of 190° C and over. Furthermore, the resultant dyeings and prints do not have the brilliance that is usually obtained on such materials using cationic dyes. However, at temperatures of 120° C to 190° C and, at very short action times, of up to 210° C, i.e., under conditions that cause virtually no damage to the polyacrylonitrile fibres, disperse dyes yield only dyeings that are faint, partly of poor fastness and therefore useless.

The vapour pressures of cationic dyes, which in their commercial forms are available principally as salts with strong inorganic acids, for examples as chlorides, bromides, methasulphates or zinc chloride double salts, are very low at temperatures below 200° C at atmospheric pressure. Unless steam and moist textile material are used, they produce on polyacrylonitrile fibres faint dyeings or no dyeings at all in the dry tranfer printing process at temperatures of 150° C to 190° C.

A process has now been found which makes it possible, in simple manner and avoiding the difficulties and disadvantages mentioned herein before, to effect on organic material that can be dyed with cationic dyes, in particular synthetic fibrous material of acid modified polyacrylonitrile, dyeings that are dry, strong and fast, especially fast to light, both with disperse and with cationic dyes.

The novel process for dyeing and printing organic material that can be dyed with cationic dyes by the transfer printing process consists in using carriers which contain at least one disperse dye and/or cationic dye which is converted into the vapour state at atmospheric pressure between 150° C and 220° C, at least one organic compound whose vapour pressure at 200° C is higher than $10^{-5}$ Torr as transfer promoter, and optionally a binder which is stable below 230° C.

It is surprising that by means of the transfer promoters according to the invention and using the dyes as defined herein it is possible to achieve an enhancement of the colour strength by up to twofold without affecting the shade and/or lowering the transfer temperature to attain the same colour strength.

The organic compounds whose vapour pressure at 200° C is higher than $10^{-5}$ Torr, and which are suitable transfer promoters in the process according to the invention, are principally organic compounds with an average molecular weight of about 100 to 300 which can contain up to 20 carbon atoms and heteroatoms, e.g. oxygen, sulphur and, in particular, nitrogen, in the molecule.

Useful transfer promoters are alkyl nitriles, especially dialkyl nitriles that are bonded through carbon atoms and, above all, through nitrogen atoms, and whose vapour pressure at 200° C is higher than $10^{-5}$ Torr.

Examples of such organic compounds are

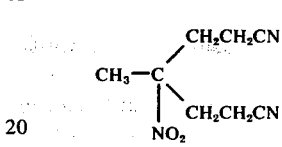

and the compounds of the formula I

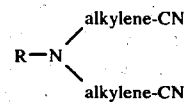

or of the formula II

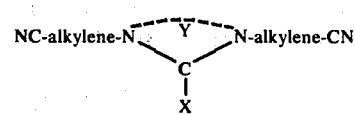

wherein R represents an optionally substituted alkyl group with 1 to 4 carbon atoms, in particular methyl, ethyl, β-hydroxyethyl or β-acetoxyethyl, a cyclohexyl group, an optionally substituted phenyl group, e.g. phenyl, methylphenyl, dimethylphenyl or chlorophenyl, or the formyl group, "alkylene" represents an alkylene group with up to 4 carbon atoms, especially ethylene but also propylene and butylene, X represents oxygen or sulphur and Y represents an alkylene group which bonds the group

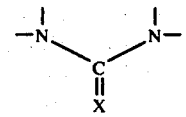

to a ring with 5 to 7 members, advantageously a 5-membered ring, in particular the compounds of the formula III

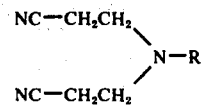

wherein R represents

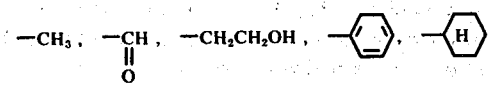

or of the formula IV

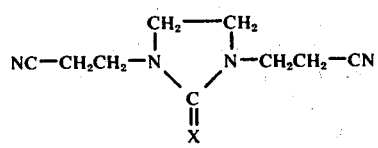

wherein X represents oxygen or sulphur, or mixtures thereof.

The dyes and transfer promoters are desirably used in the weight ratio of 1:0.3 to 1:10 and in particular of 1:1 to 1:4 in the process according to the invention.

Dyestuffs that can be used according to the invention are those which effect a tinctorially sufficient staining (dyeing) in compliance with the "Process for determining the fastness to heat setting and pleating of dyeings and prints (dry heat)" of the Swiss Standards Association, SNV 95 8 33/1961. In this Swiss Standard Specification, SNV 95 8 33/1961, a sample of the dyed material is heated in intimate contact with an undyed material for which the dye has good affinity according to conventional dyeing methods under a pressure of 40 g ± 10 g per cm² over 30 seconds at specific test temperatures.

In selecting the dyes suitable for the process according to the invention, a printed or dyed auxiliary substrate, e.g. paper, is used instead of the dyed material. The temperature is dependent on the thermal stability or on the fluidity of the substrate to be printed in the transfer process. The process is therefore carried out at temperatures approximately between 80° C and 220° C when a tinctorially adequate staining (dyeing) occurs merely on the substrate in contact with the dye on the auxiliary carrier.

According to the invention, dyes are also used which stain (dye) the undyed substrate sufficiently after a heating time of less than 30 seconds and of up to 2 minutes and/or both at lower and at higher contact pressure than that specified in the standard specification. It is immaterial whether the dye sublimes in the physical sense or penetrates into the substrate in a state other than the gaseous state if it only transfers from the auxiliary carrier to the substrate.

The disperse dyes that can be used according to the invention can belong to the most varying classes, e.g. to the azo or anthraquinone series. But quinophthalone dyes, nitro dyes, azomethine dyes, styryl dyes and the like are also possible. It is advantageous to use dyes that are transferred by sublimation or evaporation to at least 50% in less than 60 seconds under atmospheric pressure and between 150° C and 220° C. As examples of such dyes there may be cited the monoazo dyestuffs of the formula

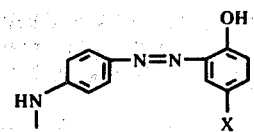

wherein each of X and Y represents a low molecular alkyl radical with 1 to 4 carbon atoms,

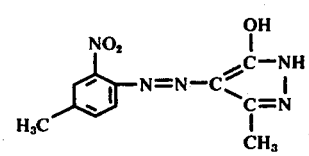

and

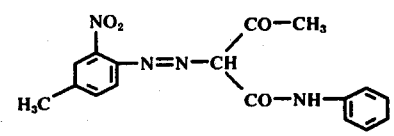

and, above all, the quinophthalone dyestuff e.g. of the formula

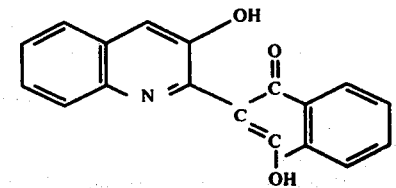

and the anthraquinone dyestuffs of the formulae

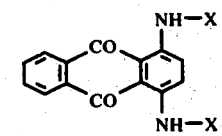

(X = alkyl with 1 to 4 carbon atoms),

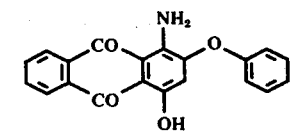

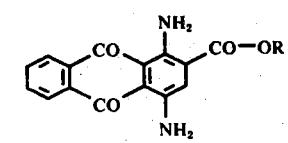

(R = alkyl with 3 to 4 carbon atoms),

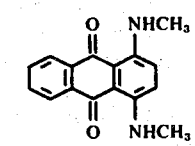

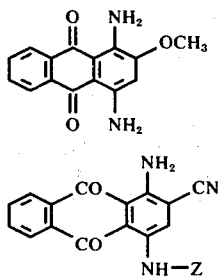

(Z = cyclohexyl or phenyl), as well as the brominated or chlorinated 1,5-diamino-4,8-dihydroxy-anthraquinones.

The cationic dyes which an be used according to the invention are in general chromophoric systems the cationic character of which derives from a carbonium, ammonium, oxonium or sulphonium group. Examples of such chromophoric systems are: methine, azomethine, hydrazone, zine, oxazine, thiazine, diazine, xanthene, acridine, polyarylmethane, e.g. diphenylmethane or triphenylmethane, and cumarine dyes with external ammonium group, for example a cycloammonium or alkylammonium group. These cationic dyes can be used in the form of their commercially available salts with strong inorganic acids, for example as chlorides, bromides, methasulphates or zinc chloride double salts. However, it is advantageous to use the cited cationic dyes in the form of their salts with acids whose $pK_s$ value is greater than 3.

Suitable salts of cationic dyestuffs with acids having a $pK_s$ value greater than 3 are in particular the carboxylic acid salts of lower aliphatic monocarboxylic acids, such as the formiates, acetates, and lactates; the salts of inorganic acids with a $pK_s$ value greater than 3 are, for example, the cyanates, thiocyanates, cyanides, phosphates, phosphites, borates, sulphites, silicates, carbonates, bicarbonates, chromates, fluorides, aluminates, sulphides and iodates, the sulphonic and sulphinic acid salts, e.g. the methanesulphonates and methanesulphinates, the alcoholates, e.g. methanolates or ethanolates or the phenolates or thiophenolates.

If desired, it is possible to use mixtures of the disperse or cationic dyes or the disperse dyes in admixture with cationic dyes in the process according to the invention.

By disperse and cationic dyes are also meant disperse fluorescent brighteners or cationic fluorescent brighteners which are converted into the vapour state at atmospheric pressure and at temperatures between 150° C and 220° C. Disperse fluorescent brighteners are prinicipally cumarins, benzocumarins, pyrazines, pyrazolines, oxazines, oxazolyl, thiazolyl, dibenzoxazolyl or dibenzimidazolyl compounds, and the cationic brighteners are those of the methine, azomethine, benzimidazole, cumarin, naphthalimide or pyrazoline series.

Examples of organic materials which can be dyed with cationic dyestuffs, and which can be dyed and/or treated with fluorescent brighteners according to the present invention, are: tannin-treated cotton, leather, wool, polyamides, such as polyhexamethylenediamine adipate, poly-ε-caprolactam or poly-ω-aminoundecanoic acid, polyesters, such as polyethylene glycol terephthalate or polycyclohexane-dimethylene terephthalate, but above all acid modified synthetic fibres, especially acid modified polyamides, e.g. polycondensation products of 4,4'-diamino-2,2'-diphenyldisulphonic acid or 4,4'-diamino-2,2'-diphenylalkanedisulphonic acids with polyamide forming starting materials, polycondensation products of monoaminocarboxylic acids or their amide forming derivatives or of dibasic carboxylic acids and diamines with aromatic dicarboxysulphonic acids, e.g. polycondensation products of ε-caprolactam or hexamethylenediammonium adipate with potassium-3,5-dicarboxybenzenesulphonate, or acid modified polyester fibres, for example terephthalic or isophthalic acid, polyhydric alcohols, e.g. ethylene glycol, and 1,2- or 1,3-dihydroxy-3-(3-sodium sulphopropoxy)-propane, 2,3-dimethylol-1-(3-sodium sulphopropoxy)-butane, 2,2-bis-(3-sodium sulphopropoxyphenyl)-propane or 3,5-dicarboxybenzenesulphonic acid or sulphonated terephthalic acid, sulphonated 4-methoxy-benzenecarboxylic acid or sulphonated diphenyl-4,4'-dicarboxylic acid. Preferred, however, are polyacrylonitrile fibres (containing at least 85% acrylonitrile) and modacryl fibres. In the polymerisation of acrylonitrile and comonomers, persulphate radicals (deriving from the usual catalyst systems) consisting of potassium persulphate, potassium metasulphite and ferriammonium sulphate, are built into the chain ends as regulators. In addition to acrylonitrile, other vinyl compounds are normally used as comonomers, e.g. vinylidene chloride, vinylidene cyanide, vinyl chloride, methacrylic amide, vinyl pyridine, methylvinyl, pyridine, N-vinylpyrrolidone, vinyl acetate, vinyl alcohol, methylmethacrylate, styrenesulphonic acid or vinylsulphonic acid.

Provided the devices suitable for the purpose are available, the fibre material dyed or treated with fluorescent brighteners according to the invention can be any in desired form, for example in the form of flocks, slubbing, yarn, texturised fibres, woven fabrics, knitted fabrics, non-wovens from fibres, ribbons, webs, textile floor coverings, such as woven needle felt carpets or hanks of yarn which can be in the form of webs or are cut or ready finished, but also in the form of sheets. The fibre material can also be in the form of blended fabrics.

The process according to the invention can be carried out, for example, in the following way: printing inks that contain dissolved or dispersed in water and/or an organic solvent at least one disperse and/or cationic dye which is converted into the vapour state at atmospheric pressure and at temperatures between 150° C and 220° C, at least one organic compound as transfer promoter with a vapour pressure at 200° C higher than $10^{-5}$ Torr, and optionally a binder which is stable below 230° C, are applied to an inert carrier and dried. The treated side of the carrier is then brought into contact with the surface of the organic material to be dyed, optionally under mechanical pressure, carrier and material are subjected to a heat treatment of 120° C to 210° C, desirably 160° C to 190° C, over the course of 5 to 60 seconds, advantageously, 5 to 30 seconds, and then the dyed material is separated from the carrier.

When using cationic dyes as defined herein, a particular embodiment of the process according to the invention consists in using printing inks that consist of a finely ground mixture of a salt of a strong inorganic acid or of a metal halide double salt of a cationic dye and an alkaline earth salt or an alkali salt of an acid with a $pK_s$ value greater than 3, at least one organic compound with a vapour pressure higher than $10^{-5}$ Torr as transfer promoter, and optionally a binder which is stable below 230° C, e.g. in the form of a suspension in a hydrophobic organic solvent, for example perchloroethylene, and otherwise carrying out the process as described hereinbefore. The double reaction to the dye salt with an acid having a $pK_s$ value greater than 3 occurs in situ direct by the application of dry heat during the heat transfer process.

The inert intermediate or auxiliary carrier required for the dry heat transfer, i.e., a carrier for which the dye salts used according to the invention have no affinity, is advantageously a flexible, preferably three-dimensionally stable sheet material, such as a ribbon, strip, or a foil with appropriately smooth surface, which is stable to heat and can consist of the most varied kinds of material, above all non-textile material, e.g. metal, such as a steel or aluminium sheet, or an endless ribbon of stainless steel, plastic or paper, preferably pure non-lacquered cellulose parchment paper which can optionally be coated with a film of vinyl resin, ethyl cellulose, polyurethane resin or teflon.

If necessary the printing inks used according to the invention also contain in addition to the dyes or fluorescent brighteners and transfer promoters defined herein at least one binder that is stable below 230° C and acts as thickener for the printing batch and as at least temporary binder of the dyestuff on the carrier to be printed. Synthetic, semisynthetic, and natural resins, i.e., both polymerisation and polycondensation and polyaddition products, are suitable as such binders. In principle, it is possible to use all resins and binders customarily used in the printing ink and paint industry. The binders should not melt at the transfer temperature, react chemically in the air or with themselves (e.g. cross-link), have little or no affinity for the dye salts used, solely maintain the cationic dye salts at the printed area of the inert carrier without changing it, and remain on the carrier in their entirety after the heat transfer process. Preferred binders are those that are soluble in organic solvents and that dry rapidly for example in a warm current of air and form a fine film on the carrier. Suitable water-soluble binders are: alginate, tragacanth, carubin (from locust bean gum), dextrin, more or less etherified and esterified mucilages, hydroxyethyl cellulose or carboxymethyl cellulose, water-soluble polyacrylic amides or, above all, polyvinyl alcohol; and suitable binders that are soluble in organic solvents are cellulose esters, such as nitrocellulose, cellulose acetate or butyrate, and, in particular, cellulose ethers, such as methyl, ethyl, propyl, isopropyl, benzyl, hydroxypropyl, or cyanoethyl cellulose, and also mixtures thereof.

When using dispersions, the dye salts dispersed in the printing ink must have principally a particle size of $\leq 10\mu$, preferably $\leq 2\mu$.

Besides water, practically all water-miscible and water-immiscible organic solvents or solvent mixtures are suitable which boil at atmospheric pressure at temperatures below 220° C, preferably below 150° C, and which havve sufficient solubility or emulsifiability (dispersibility) for the dye salts and binders used for the manufacture of the printing inks. The following may be cited as examples of suitable organic solvents: aliphatic and aromatic hydrocarbons, e.g. n-heptane, cyclohexane, petroleum ether, benzene, xylene or toluene, halogenated hydrocarbons, e.g. methylene chloride, trichloroethylene, perchloroethylene or chlorobenzene, nitrated aliphatic hydrocarbons, e.g. nitropropane, aliphatic amides, e.g. dimethyl formamide or mixtures thereof, also glycols, e.g. ethylene glycol or ethylene glycol monoalkyl ethers, e.g. ethylene glycol monoethyl ether, diethyl carbonate, dimethyl carbonate, or esters of aliphatic monocarboxylic acids, e.g. ethyl acetate, propyl acetate, butyl acetate, β-ethoxyethyl acetate, aliphatic or cycloaliphatic ketones, for example methyl ethyl ketone, methyl isobutyl ketone, cyclohexanone, isophoron, mesityl oxide, or diacetone alcohol and alcohols, e.g. methanol, ethanol, and, preferably, n-propanol, isopropanol, n-butanol, tert. butanol, sec. butanol, or benzyl alcohol; also suitable are mixtures of the cited solvents, e.g. a mixture of methyl ethyl ketone and ethanol in the ratio 1:1.

Particularly preferred solvents are esters, ketones, or alcohols which boil below 120° C, e.g. butyl acetate, acetone, methyl ethyl ketone, ethanol, isopropanol or butanol. Virtually anhydrous printing inks are used with advantage.

The desired viscosity of the printing inks can be adjusted by addition of the cited binders, or by dilution with water or a suitable solvent.

The printing inks according to the invention (solutions, dispersions, emulsions) are manufactured by methods which are known per se and contain normally 0.01 to 80, desirably 1 to 30, percent by weight of at least one or more of the dyes or fluorescent brighteners defined herein, 0.1 to 80 percent by weight, desirably 2 to 60 percent by weight, of transfer promoter, and optionally 0.5 to 50 percent by weight of a binder, based on the total weight of the preparation, and they can be used direct or after dilution as printing inks according to the invention.

The suitability of the printing inks can be improved by adding optional components, for example plasticisers, swelling agents, high boiling solvents such as e.g. tetralin or declin, iogenic or non-ionogenic surface active compounds, for example the condensation product of 1 mol of octylphenol with 8 to 10 mols of ethylene oxide.

The optionally filtered printing inks are applied to the inert carrier for example by spraying, coating, or advantageously by printing the carrier on parts of the surface or over the entire surface. It is also possible to apply a multicoloured pattern or to print successively in a base shade and subsequently with similar or different patterns.

After the printing inks have been applied to the inert carrier, these are then dried, e.g. with the aid of a flow of warm air or by infrared irradiation, optionally with recovery of the solvent employed.

The carriers can also be printed on both sides, whereby it is possible to select dissimilar colours and/or patterns for both sides. In order to avoid using a printing machine, the printing inks can be sprayed onto the auxiliary carrier, for example by using a spray gun. Particularly interesting effects are obtained if more than one shade is printed or sprayed onto the auxiliary carrier simultaneously. Furthermore, specific patterns can be obtained for example by using stencils or artistic patterns by using a brush. If the auxiliary carriers are printed, the most diverse forms of printing methods can be employed, for example relief printing (e.g. letterpress printing, flexographic printing), intaglio printing (e.g. roller printing), silk-screen printing (e.g. rotary screen printing, flat-screen printing) or electrostatic printing.

The transfer is performed in the conventional manner by the action of heat. The treated carriers are brought into contact with the textile materials and kept at 120° C to 210° C until the dye salts applied to the carrier are transferred to the textile material. As a rule 5 to 60 seconds suffice for this.

The heat can be applied in various known ways, e.g. by passage through a hot heater drum, a tunnel-shaped heating zone or by means of a heated cylinder, advantageously in the presence of an unheated or heated backing roll which exerts pressure or of a hot calender, or also by means of a heated plate (iron or warm press), the various devices being preheated by steam, oil, infrared irradiation or microwaves to the required temperature, optionally under vacuum, or being located in a peheated heating chamber.

Upon completion of the heat treatment the printed goods are removed from the carrier. The printed material requires no aftertreatment, neither a steam treatment to fix the dyestuff nor washing to improve the fastness properties.

Compared with known processes, the process according to the invention has notable advantages. It has in particular the principal advantage of the now largely solved problem of achieving strong, brilliant dyeings and prints which are fast to wet treatments and light and of powerful whitening effects on polyacrylonitrile fibres while maintaining optimum mechanical fibre properties.

The following Examples illustrate the invention but do not in any way limit the scope thereof. Parts and percentages are by weight.

EXAMPLE 1

The following ingredients are ground for 4 hours with cooling in a sand mill:
- 250 g of ethanol
- 250 g of water
- 225 g of methyl ethyl ketone
- 75 g of hydroxypropyl cellulose (Klucel ER)
- 50 g of sodium acetate
- 100 g of transfer promoter of the formula

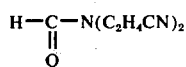

and
50 g of the dye of the formula

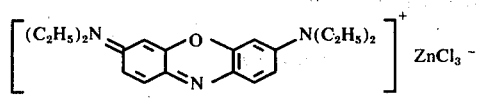

The deep blue printing ink obtained after separating the sand from the grinding stock is applied to the entire surface of a paper strip by spraying, printing or coating and subsequently dried.

A polyacrylonitrile fabric (ORLON) is laid on this pretreated intermediate carrier and carrier and fabric are brought into contact for 30 seconds using a heating plate at 190° C (temperature of the plate). A second heated plate, insulated with asbestos and wool felt, ensures uniform contact. The dyed fabric is then separated from the carrier. A polyacrylonitrile fabric that is dyed a strong blue shade of excellent wet fastness and good light fastness is obtained in this way.

By carrying out the procedure described in Example 1, but without using a transfer promoter, the polyacrylonitrile fabric is also dyed blue but to only half the colour strength.

Strong, blue dyeings or prints which are fast to wet treatments and light are also obtained on polyacrylonitrile fibres by using corresponding amounts of one of the organic compounds listed in Table 1 instead of the transfer promoter cited hereinabove and by otherwise carrying out the procedure as previously described in this Example.

Table 1

| Example | organic compounds |
|---|---|
| 2 | NC—CH₂—CH₂—N(CH₂CH₂)₂N—CH₂—CH₂—CN with C=S bridge |
| 3 | NC—CH₂—CH₂—N(CH₂CH₂)₂N—CH₂—CH₂—CN with C=O bridge |
| 4 | HOCH₂—CH₂—N(C₂H₄CN)₂ |

EXAMPLE 5

40 g of the disperse dye of the formula

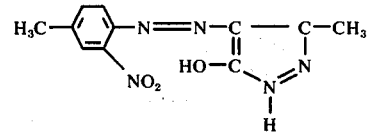

10 g of 1,1'-dicyanoethyl formamide as transfer promoter
10 g of ethyl cellulose
43 g of ethanol and
43 g of methyl ethyl ketone are ground in a swiftly rotating ball mill with glass beads diameter 1 mm > to a particle size of the dye of 1μ to 3μ. The liquid paste is subsequently separated from the glass beads. The resultant printing ink is applied to the entire surface of a paper strip by spraying, printing or coating and subsequently dried.

A polyacrylonitrile fabric (ORLON) is laid on this pretreated carrier and carrier and fabric are brought into contact for 30 seconds by means of a heating plate at a temperature of 190° C (temperature of plate). A second plate insulated with asbestos and wool felt ensures uniform contact. The dyed fabric is then separated from the carrier. Polyacrylonitrile fabric dyed a strong yellow shade of good wet fastness properties is obtained in this way.

By carrying out the procedure as described in Example 2, but without using a transfer promoter, only an extremely faint yellow dyeing is produced on polyacrylonitrile fabric.

EXAMPLE 6

By using corresponding amounts of one of the dyes of the formulae

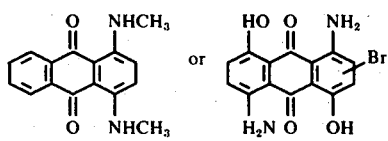

instead of the dye specified in Example 5, and corresponding amounts of an organic compound of the formula

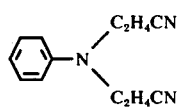

instead of the transfer promoter specified in Example 5, and otherwise carrying out the procedure as described in Example 5, there is obtained at a transfer temperature of 190° C a polyacrylonitrile fabric dyed a strong blue shade of excellent fastness properties.

Blue dyeings of similar strength on polyacrylonitrile fabric are only obtained at a transfer temperature of 220° C over the course of 60 seconds by carrying out the procedure as described in Example 5, but without using a transfer promoter.

EXAMPLE 7

Polyacrylonitrile fabric dyed a strong yellow shade of excellent fastness properties is likewise obtained at a transfer temperature of 185° C by using corresponding amounts of one of the dyes of the formulae

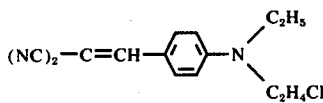

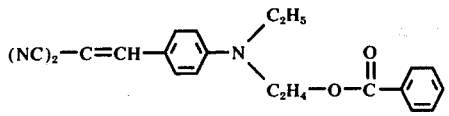

or

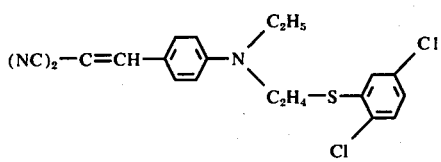

instead of the dye referred to in Example 5 and corresponding amounts of an organic compound of the formula

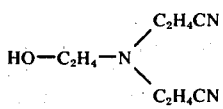

instead of the transfer promoter referred to in Example 5 and otherwise carrying out the procedure as described therein.

EXAMPLE 8

0.3 g of the dye of the formula

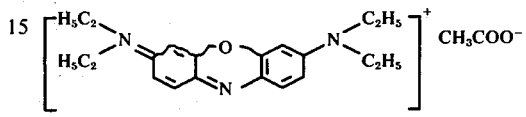

and 0.3 g of the transfer promoter of the formula

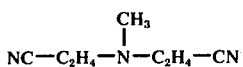

are dissolved in 3 ml of methanol and the solution is filtered. The resultant blue printing ink is applied to the entire surface of a carrier of stainless steel by coating and subsequently dried. Polyacrylonitrile fabric (Acrylan Regular Type 36) is laid on the pretreated carrier and carrier and fabric are kept in contact for 10 seconds at a temperature of 190° C using an ironing machine. The dyed fabric is then removed from the carrier.

A polyacrylonitrile fabric which is dyed a strong blue shade of excellent wet fastness and good light fastness is obtained in this way.

EXAMPLE 9

With stirring 0,3 g of the dye of the formula

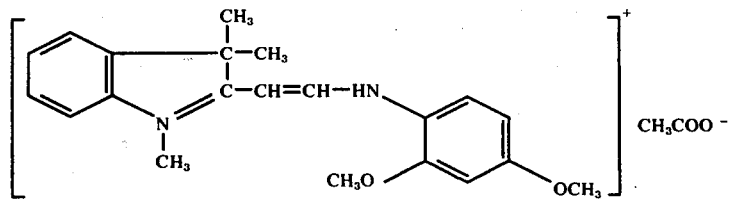

and 0.5 g of the transfer promoter of the formula

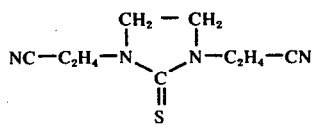

are dissolved in 10 ml of a mixture consisting of 10 parts of ethyl cellulose (Ethocel E 7, Dow Chem.), 15 parts of ethanol and 45 parts of methyl ethyl ketone and the solution is filtered.

A pattern is produced on an aluminium foil with the resultant yellow printing ink by the roller printing method using a colour furnisher and dried. A piece of polyacrylonitrile knitted fabric is placed on the printing foil and carrier and goods are brought into contact for 30 seconds at 180° C using a calander.

A true reproduction of the yellow pattern on the polyacrylonitrile fabric is obtained by otherwise carrying out the procedure as described in Example 1, the lines remaining sharp and clear. The yellow dyeing has excellent wet fastness and good fastness to light.

Strong dyeings and prints which are fast to wet treatments and light are also obtained on polyacrylonitrile fibres in the shades indicated in the last column of Table 2 by using corresponding amounts of one of the carboxylic acid dye salts listed in the Table or salts with a $pK_s$ value greater than 3 instead of the carboxylic acid salt of a cationic dye referred to in Examples 8 and 9, and carrying out the procedure with the resultant printing ink as described in Examples 1 and 9.

Table 2

| I Example | II dye salt | III shade on polyacrylonitrile |
|---|---|---|
| 10 | [structure] $C_{18}H_{37}COO^-$ | red |
| 11 | [structure] $CH_3COO^-$ | brilliant yellow |
| 12 | [structure] $CH_2-CH_2COO^-$ with $OH$ | blue |
| 13 | [structure] $CH_3COO^-$ | pink |
| 14 | [structure] $HCOO^-$ | red |
| 15 | [structure] $HCOO^-$ | blue |
| 16 | [structure] $CH_3COO^-$ | scarlet |
| 17 | [structure] $CH_3COO^-$ | blue |

Table 2-continued
| I Example | II dye salt | III shade on polyacrylonitrile |
|---|---|---|
| 18 | 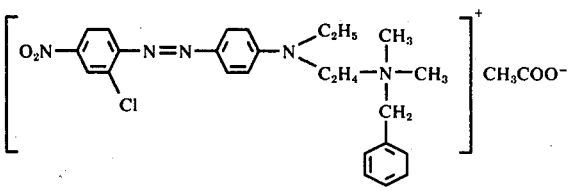 | red |
| 19 | 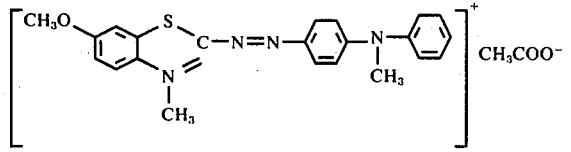 | blue |
| 20 | 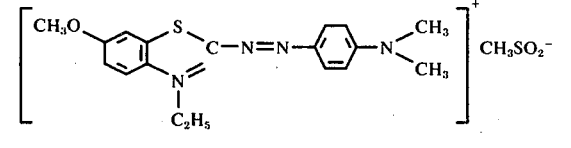 | blue |
| 21 | 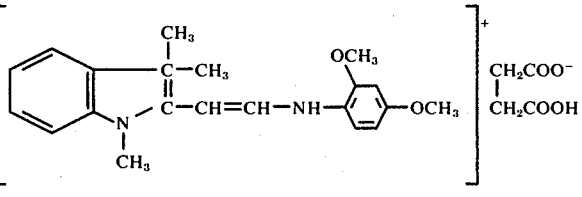 | yellow |
| 22 | 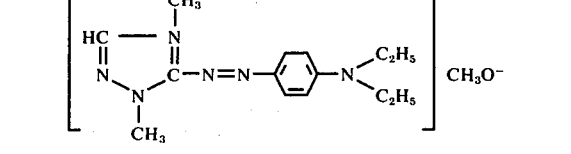 | red |
| 23 | 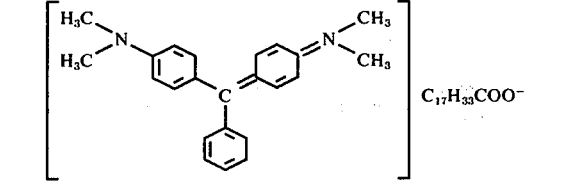 | green |
| 24 | 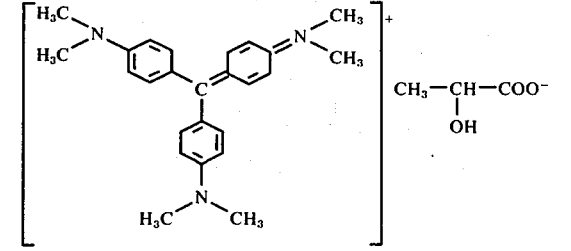 | violet |
| 25 | 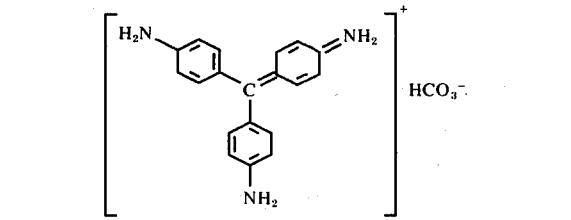 | red |

Table 2-continued

| I Example | II dye salt | III shade on polyacrylonitrile |
|---|---|---|
| 26 | ![structure with H2C5, C2H5 amine groups, COOH, CH3COO−] | bluish red |
| 27 | ![structure with Cl, CH3, indole, CH3COO−] | green |
| 28 | ![structure with H5C2, C2H5, Br, HCOO−] | blue |
| 29 | Mixture consisting of 1 part of the dye of the formula given in Example 1 and 2 parts of the dye of the formula given in Example 11. | green |

EXAMPLE 30

With stirring, 1 g of the fluorescent brightener of the formula

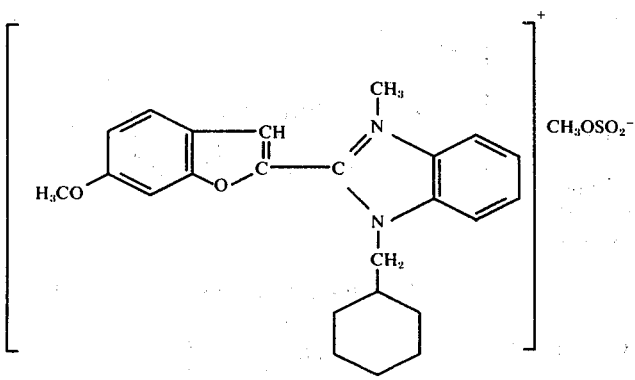

6 ml of methanol, 1 g of the transfer promoter of the formula

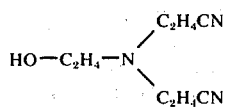

and 4 ml of water are thoroughly mixed for 1 hour. The resultant and filtered solution is applied by coating to paper coated with Teflon and subsequently dried. Polyacrylonitrile knitted fabric of 100 to 200 g/m² is laid on the treated carrier and carrier and material are heated for 30 seconds to 190° C while being kept in intimate contact. The brightened fabric is then removed from the carrier. Brightened polyacrylonitrile knitted fabric with good fastness properties is obtained in this way.

EXAMPLE 31

1 g of the dye (in commercial form) of the formula

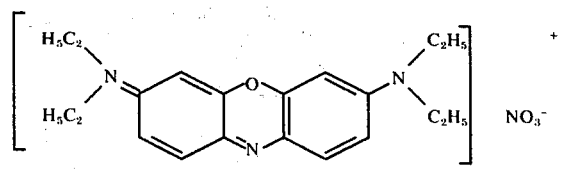

1 g of the formula

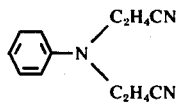

and 4 g of CH₃-ONa are added to 12 ml of methyl alcohol and thoroughly mixed with stirring for 30 minutes at 20° C to 25° C. The solution is then filtered.

The resultant deep blue printing ink is applied to the entire surface of a strip of paper by spraying, printing or coating, and subsequently dried. A polyacrylonitrile fabric (ORLON) is laid on the pretreated carrier, whereupon carrier and fabric are brought into contact for 60 seconds at 180° C using a hot heating plate. A second plate which is not heated ensures uniform contact. The dyed fabric is then removed from the carrier.

A polyacrylonitrile fabric dyed a strong, blue shade of excellent wet fastness and good light fastness is obtained in this way.

EXAMPLE 32

With stirring, 1 g of the dye (in commercial form) of the formula

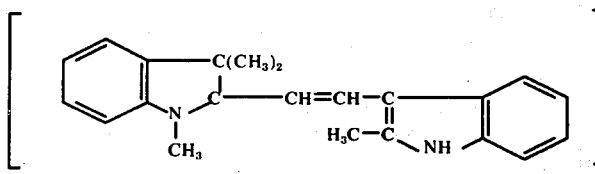

1 g of the transfer promoter of the formula

6 ml of methanol, 2 ml of water and 2 g of sodium methanesulphinate are thoroughly mixed.

A brilliant orange dyeing of excellent wet fastness and good light fastness is obtained on polyacrylonitrile fabric by otherwise carrying out the procedure as described in Example 31.

EXAMPLE 33

With stirring, 1 g of the dye (in commercial form) of the formula

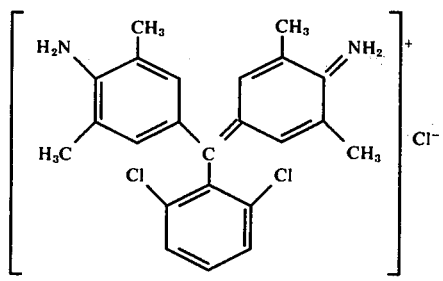

0.8 g of the transfer promoter of the formula

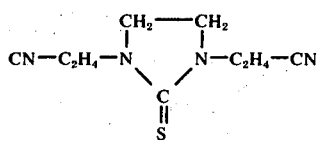

6 ml of methanol, 2 ml of water and 3 g of trisodium phosphate are thoroughly mixed.

A brilliant blue dyeing of excellent wet fastness and good light fastness is obtained on polyacrylonitrile fabric by otherwise carrying out the procedure as described in Example 31.

EXAMPLE 34

With stirring, 1 g of the dye (in commercial form) of the formula

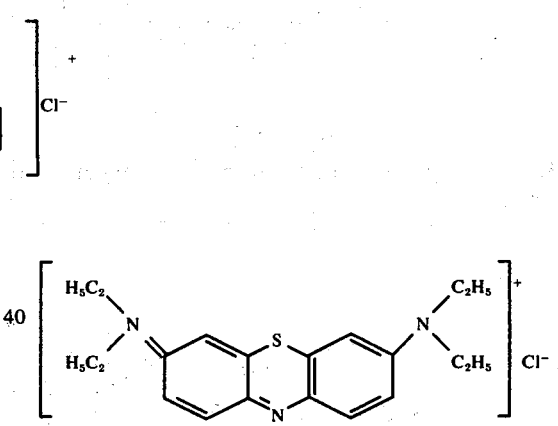

0.8 g of the transfer promoter of the formula

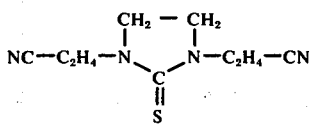

6 ml of methanol, 2 ml of water and 1.5 g of sodium tetraborate are thoroughly mixed.

A brilliant blue dyeing of excellent wet fastness and good light fastness is obtained of polyacrylonitrile fabric by otherwise carrying out the procedure as described in Example 31.

EXAMPLE 35

With stirring, 1 g of the dye (in commercial form) of the formula

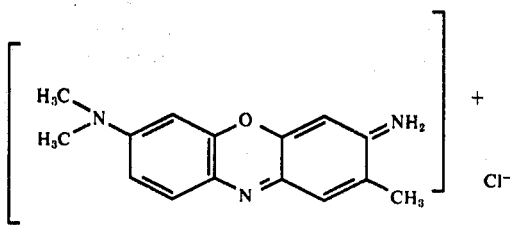

0.6 g of the transfer promoter of the formula

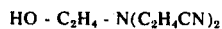

5 ml of isopropanol, 1 ml of methyl ethyl ketone, 2 ml of water and 2 g of potassium chromate are thoroughly mixed.

A brilliant blue dyeing on polyacrylonitrile fabric of excellent wet fastness and good light fastness is obtained by otherwise carrying out the procedure as described in Example 1.

Brilliant blue dyeings on polyacrylonitrile fabric of similarly good fastness properties are also obtained by using corresponding amounts of sodium metaborate, sodium phosphite, sodium bicarbonate, sodium sulphide, or sodium fluoride, instead of the 2 g of potassium chromate indicated in the Example, and by otherwise carrying out the procedure as described in Example 1.

Brilliant blue dyeings of excellent wet fastness and good light fastness on polyacrylonitrile fabric are likewise obtained by using instead of the solvent mixture indicated in the Example a mixture consisting of 80% ethanol and 20% ethylene glycol monomethyl ether and instead of 2 g of potassium chromate corresponding amounts of sodium ethylate, potassium methylate, sodium phenolate, sodium hexanolate, sodium cresolate, sodium thiophenolate, lithium acetate, sodium formate or sodium lactate, and by otherwise carrying out the procedure as described in Example 1.

Strong dyeings and prints which are fast to wet treatments and light are also obtained on polyacrylonitrile fabric in the shades indicated in the last column of Table 3 by using corresponding amounts of one of the dye salts listed in the Table instead of the cationic dyes indicated in the Example and by otherwise carrying out the procedure as described in Example 1.

Table 3

| Example | dye salt | shade on PAC |
|---|---|---|
| 36 | (structure) | blue |
| 37 | (structure) | blue |
| 38 | (structure) | blue |

Blue dyeings of similarly good fastness properties are obtained by using 8 ml of water instead of the solvent mixture indicated in the Example and by otherwise carrying out the procedure as described in Example 1.

EXAMPLE 39

With stirring, 0.3 g of the dye of the formula

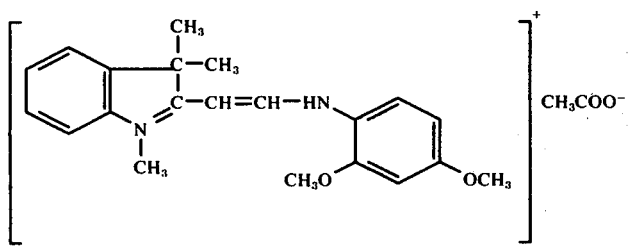

0.1 g of the dye of the formula

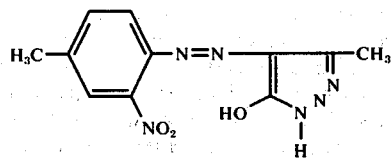

and 0.5 g of the transfer promoter of the formula

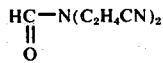

are suspended in 10 ml of a mixture consisting of 10 parts of ethyl cellulose (Ethocel E 7, Dow Chem.), 15 parts of ethanol, and 45 parts of methyl ethyl ketone.

A pattern is produced on an aluminium foil with the resultant yellow printing ink by the roller printing method using a colour furnisher, and dried. A polyacrylonitrile knitted fabric is laid on the printed foil and carrier and material are brought into contact for 30 seconds at 190° C.

A true reproduction of the yellow pattern on the polyacrylonitrile knitted fabric, the lines remaining sharp and clear, is obtained by otherwise carrying out the procedure as described in Example 1. The yellow dyeing has excellent wet fastness and good light fastness.

EXAMPLE 40

1 g of the dye of the formula

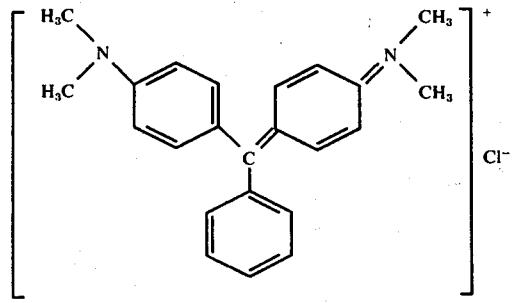

1 g of the transfer promoter of the formula

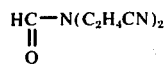

1 g of trisodium phosphate and 0.5 g of ethyl cellulose (Ethocel E 7, Dow Chem.), are ground for 4 hours in 18 g of perchloroethylene. The resultant suspension is applied to cellulose parchment paper by coating and subsequently dried. A polyacrylonitrile fabric is laid on the treated carrier and carrier and material are heated for 20 seconds to 180° C. while being kept in intimate contact. The dyed knitted fabric is then removed from the carrier.

By carrying out the procedure as described in Example 40, but without using a transfer promoter, there is also obtained a polyacrylonitrile knitted fabric which is dyed green but to only half the colour strength.

We claim:

1. In a process for the dyeing or printing of organic material by the transfer printing process which comprises bringing the surface of an inert carrier sheet treated with a printing ink into contact with the surface of an organic material which can be dyed or printed with cationic dyes, subjecting the carrier and organic material to heat treatment for a time and at a temperature sufficient to achieve dyeing or printing of the organic material and separating the organic material from the said inert carrier, the improvement according to which the printing ink for treating the inert carrier comprises a dispersion or solution of at least one member of the group of disperse dyestuffs, cationic dyestuffs, and mixtures thereof said dyestuffs being from among those which are converted to the vapour state at atmospheric pressure and at a temperature of between 150° C and 220° C and at least one organic compound as transfer promotor having a vapour pressure higher than $10^{-5}$ Torr at 200° C and being selected from the group of a. A compound of the formula

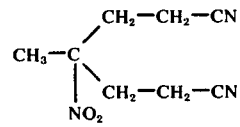

b. A compound of the formula

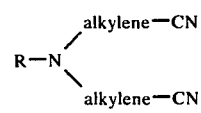

wherein "alkylene" is of 1 to 4 carbon atoms, R represents alkyl of 1 to 4 carbon atoms, α-hydroxyethyl, α-acetoxyethyl, cyclohexyl, phenyl, methylphenyl, dimethylphenyl, chlorophenyl, or formyl, and c. A compound of the formula

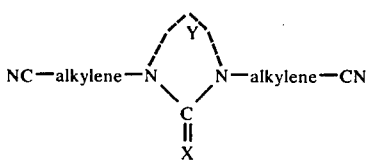

wherein X represents oxygen or sulfur,
Y represents alkylene which bonds the group

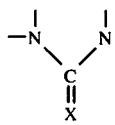

to a ring with 5 to 7 members, and "alkylene" is of 1 to 4 carbon atoms.

2. A process according to claim 1 wherein the transfer promotor is a compound from the group of (a) a compound of the formula

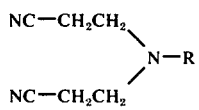

wherein R represents

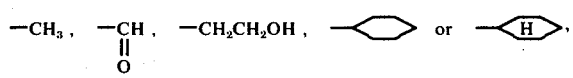

b. a compound of the formula

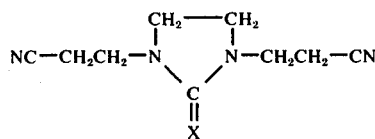

wherein X represents oxygen or sulphur.

3. A process according to claim 1 wherein the carrier and organic material are subjected to a heat treatment of 120° C to 210° C over the course of 5 to 6 seconds under mechanical pressure.

4. A process according to claim 1 wherein disperse dyes are employed which are transferred to at least 50% in less than 60 seconds under atmospheric pressure and at a temperature between 150° C and 220° C.

5. A process according to claim 1 wherein cationic dyes in the form of their salts with acids with a $pK_s$ value greater than 3 are employed.

6. A process according to claim 1 wherein the organic material comprises polyacrylonitrile or modacryl fibers.

7. A process according to claim 1 wherein the carrier and organic material to be dyed are subjected to a heat treatment of 60° to 190° C over the course of 5 to 30 seconds.

8. In a carrier for use in the transfer printing process said carrier comprising an inert sheet selected from the group consisting of paper, aluminum foil and steel having at least one face thereof treated with a printing ink, the improvement according to which the printing ink composition comprises a dispersion or solution of at least one member of the group of disperse dyestuffs, cationic dyestuffs and mixtures thereof said dyestuffs being from among those which are converted to the vapour state at atmospheric pressure and at a temperature of between 150° C and 220° C, and there is present in the composition at least one organic compound as transfer promotor having a vapour pressure higher than $10^-$ Torr at 200° C and being selected from the group of a. A compound of the formula

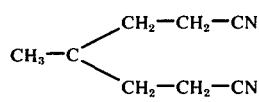

b. A compound of the formula

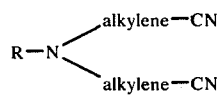

wherein "alkylene" is of 1 to 4 carbon atoms, R represents alkyl of 1 to 4 carbon atoms, α-hydroxyethyl, α-acetoxyethyl, cyclohexyl, phenyl, methylphenyl, dimethylphenyl, chlorophenyl, or formyl, and c. A compound of the formula

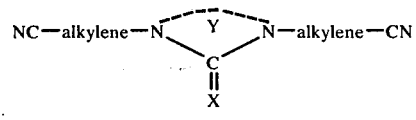

wherein X represents oxygen or sulfur,
Y represents alkylene which bonds the group

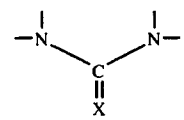

to a ring with 5 to 7 members, and "alkylene" is of 1 to 4 carbon atoms.

9. A carrier according to claim 8 wherein the printing ink composition contains a cellulose ether or cellulose ester as binder.

10. A carrier according to claim 8 wherein the printing ink composition is an aqueous composition which contains polyvinyl alcohol as binder.

* * * * *